US012722179B2

(12) United States Patent
Govers

(10) Patent No.: US 12,722,179 B2
(45) Date of Patent: Sep. 1, 2026

(54) METHOD AND COATER FOR COATING OF A FLAT SUBSTRATE

(71) Applicant: Canon Production Printing Holding B.V., Venlo (NL)

(72) Inventor: Janneke M. Govers, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 41 days.

(21) Appl. No.: 18/917,115

(22) Filed: Oct. 16, 2024

(65) Prior Publication Data

US 2025/0135487 A1 May 1, 2025

(30) Foreign Application Priority Data

Oct. 27, 2023 (EP) .................................... 23206362

(51) Int. Cl.
*B05C 1/08* (2006.01)
*B05D 1/28* (2006.01)

(52) U.S. Cl.
CPC ............ *B05C 1/0873* (2013.01); *B05C 1/083* (2013.01); *B05D 1/28* (2013.01)

(58) Field of Classification Search
CPC ..... B05C 1/0882; B05C 1/025; B05C 1/0878; B05C 1/0873; B41F 23/08; B41J 11/009; B41J 11/0015; B05D 1/28
See application file for complete search history.

(56) References Cited

U.S. PATENT DOCUMENTS

| | | | | |
|---|---|---|---|---|
| 5,466,291 | A | 11/1995 | DiRico | |
| 6,381,423 | B1 * | 4/2002 | Eom | G03G 15/167 271/265.04 |
| 2016/0236225 | A1 | 8/2016 | Wright | |
| 2020/0324548 | A1 | 10/2020 | Achi | |
| 2022/0388021 | A1 | 12/2022 | Kappel et al. | |

FOREIGN PATENT DOCUMENTS

| | | | | | |
|---|---|---|---|---|---|
| CN | 114042610 | A * | 2/2022 | B05C 1/0808 |
| DE | 102016110648 | A1 * | 12/2017 | B41F 31/06 |
| KR | 10-2018-0092282 | A | 8/2018 | |

OTHER PUBLICATIONS

European Search Report, issued in Application No. 23 20 6362, dated Mar. 28, 2024.

* cited by examiner

*Primary Examiner* — Alex A Rolland
(74) *Attorney, Agent, or Firm* — Birch, Stewart, Kolasch & Birch, LLP

(57) ABSTRACT

A method for coating a flat substrate by a coater includes a control system receiving print job data and print job settings, the control system determining a suitable impression of an application roller by means of received print job settings, a first sensor determining a radius of the application roller, determining an axis location of the application roller having a distance of the radius of the application roller plus a nominal thickness of the flat substrate read from the print job data minus the determined suitable impression from the supporting roller surface, automatically moving the application roller to the determined axis location, and starting a transport of the flat substrate from an entry station in-between the supporting roller and the application roller towards an end station.

9 Claims, 5 Drawing Sheets

METHOD AND COATER FOR COATING OF A FLAT SUBSTRATE

BACKGROUND OF THE INVENTION

Field of the Invention

The present invention relates to a method for coating a flat substrate by a coater comprising an entry station for receiving the flat substrate to be coated, a control system for controlling print job data, print job settings and coater settings, an application module comprising a supporting roller for supporting the flat substrate and an application roller for transferring a layer of coating from a surface of the application roller towards the flat substrate, and an end station for storing the flat substrate when coated.

Description of Background Art

Roll coating is a method of applying thin films of finishing material to flat substrate of wood, metal, carton, heavy-weight paper or plastic. The flat substrate may be a printed media. The principle of roll coating is well known and based on the physics of transferring a layer of coating from the surface of a roller to the surface of a substrate. Roll coating is a highly effective method, precise in application and environmentally friendly and offering nearly 100% of transfer efficiency.

The most common type of roll coater is the differential direct style where the moving components are individually and manually adjusted in speed and direction. In this way an operator controls the coating process. The process of transporting a layer of coating from the roll requires several key components. A conveyor belt or rolling system moves the substrate under the application roller to enable the film transfer. The application roller carries the coating film which will be transferred to the substrate. The application roller is covered with various materials and densities to facilitate the coating application. The application roller is exchangeable since, in the case that coating is done by means of substrates with knock out areas (places where no coating is wanted), each substrate length has its corresponding application roller diameter.

The coater comprises an applying mechanism which is configured to apply the coating to the application roller. For example, a known application mechanism comprises a metal doctor roller or metering roller which works in conjunction with the application roller to form a packet of coating called a nip. The film thickness on the application roller may be determined by the distance between the two rollers and the speed and rotation direction of each roller. The film thickness may also be determined by a mechanism which transfers the coating from a bulk storage to the application roller, for example by means of an anilox roller.

Machine set up begins with an initial manual adjustment of the application roller to a desired height. Typically the application roller is set to a light impression with respect to the substrate. Conveyor and application roll speed are set and synchronized based upon production requirements.

When a substrate is coated, the coated substrate is transferred to the end station. The weight of the coating film may be determined by a scale. From the resulting weight coating adjustments can be determined.

However, such adjustments are made manually by the operator by means of the nip, the roller speeds and the height of the application roll. When a new print job is loaded, it usually takes time, operator skills and waste flat substrates to install the correct application roller height in the coater (a flexographic unit) to achieve perfect impression on the flat substrate. Up until now the printing speed is slowed down, so the operator can look at the print result while adjusting the printing roller height until he/she judged the impression to be good. However, under impression leads to an incomplete coating layer and over impression could lead to damages at the application roller or damages at the substrate.

The control system may also be referred to as controller or as control unit hereinafter.

SUMMARY OF THE INVENTION

It is the objective of the present invention to minimize the time needed for the run-in of a print job and to prevent the waste of pieces of flat substrate during a run-in of a print job.

In accordance with the present invention, a method for coating the flat substrate is provided wherein the coater comprises a first sensor for determining a radius of the application roller and the application module is configured to transport the flat substrate from the entry station in-between the supporting roller and the application roller towards the end station, wherein the method comprises the steps of a) the control system receiving print job data and print job settings, b) the control system determining a suitable impression of the application roller by means of received print job settings, c) the first sensor determining a radius of the application roller, d) determining an axis location of the application roller having a distance of the radius of the application roller plus a nominal thickness of the flat substrate read from the print job data minus the determined suitable impression from the supporting roller surface, e) automatically moving the application roller to the determined axis location, and f) starting the transport of the flat substrate from the entry station in-between the supporting roller and the application roller towards the end station.

By doing so, when a new print job is loaded, it takes less time, less operator skills and less waste substrates to install the correct application roller height in the coater to achieve a perfect impression on the substrate. Less or even no waste of substrates will occur during the run-in of a print job.

Instead of the operator entering a diameter of the application roller at each time an application roller is exchanged when a substrate length changes, the first sensor is in place in order to errorlessly, accurately and instantaneously measure the radius of the application roller.

According to an embodiment the step of the control system determining a suitable impression of the application roller by means of the print job settings comprises the sub-steps of reading from the print job settings a type of the flat substrate, reading a hardness range for the type of flat substrate from a set of hardness ranges for types of media stored in memory of the control system, and deriving from the read hardness range a suitable impression of the application roller.

According to an embodiment the application module comprises a second sensor for determining an actual thickness of the flat substrate and the method comprises the steps of determining an actual thickness of the flat substrate and adjusting the determined axis location of the application roller and automatically moving the application roller to the adjusted axis location.

According to an embodiment the second sensor is positioned between the entry station and the application module or between the application module and the end station. Preferably the second sensor is positioned between the entry station and the application module.

According to an embodiment the flat substrate is a print medium which is printed upon by a printer connected to the coater. The printer proceeds the coater in a production process of printing upon a print medium which is after printing coated by the coater in order to deliver a coated and printed print medium. Hereinafter and hereinbefore the printed print medium may also be called a printed medium.

The present invention also relates to a coater comprising an entry station for entering a flat substrate to be coated, a control system for controlling print job data, print job settings and coater settings, an application module comprising a supporting roller for supporting the flat substrate and an application roller for transferring a layer of coating from a surface of the application roller towards the flat substrate, an end station for storing the flat substrate when coated, and a first sensor for determining a radius of the application roller, wherein the application module is configured to transport the flat substrate from the entry station in-between the supporting roller and the application roller towards the end station, and the coater is configured to perform the steps of the method according to the present invention. The coater is provided with a moving mechanism in order to move the application roller in a height direction.

According to an embodiment the application module comprises a second sensor for determining an actual thickness of the flat substrate, and the coater is configured to determine an actual thickness of the flat substrate and to adjust the determined axis location of the application roller and to automatically move the application roller to the adjusted axis location.

The present invention further relates to a software product comprising program code on a machine-readable medium, which program code, when loaded into a control system of a coater, causes the coater to execute the steps of the method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
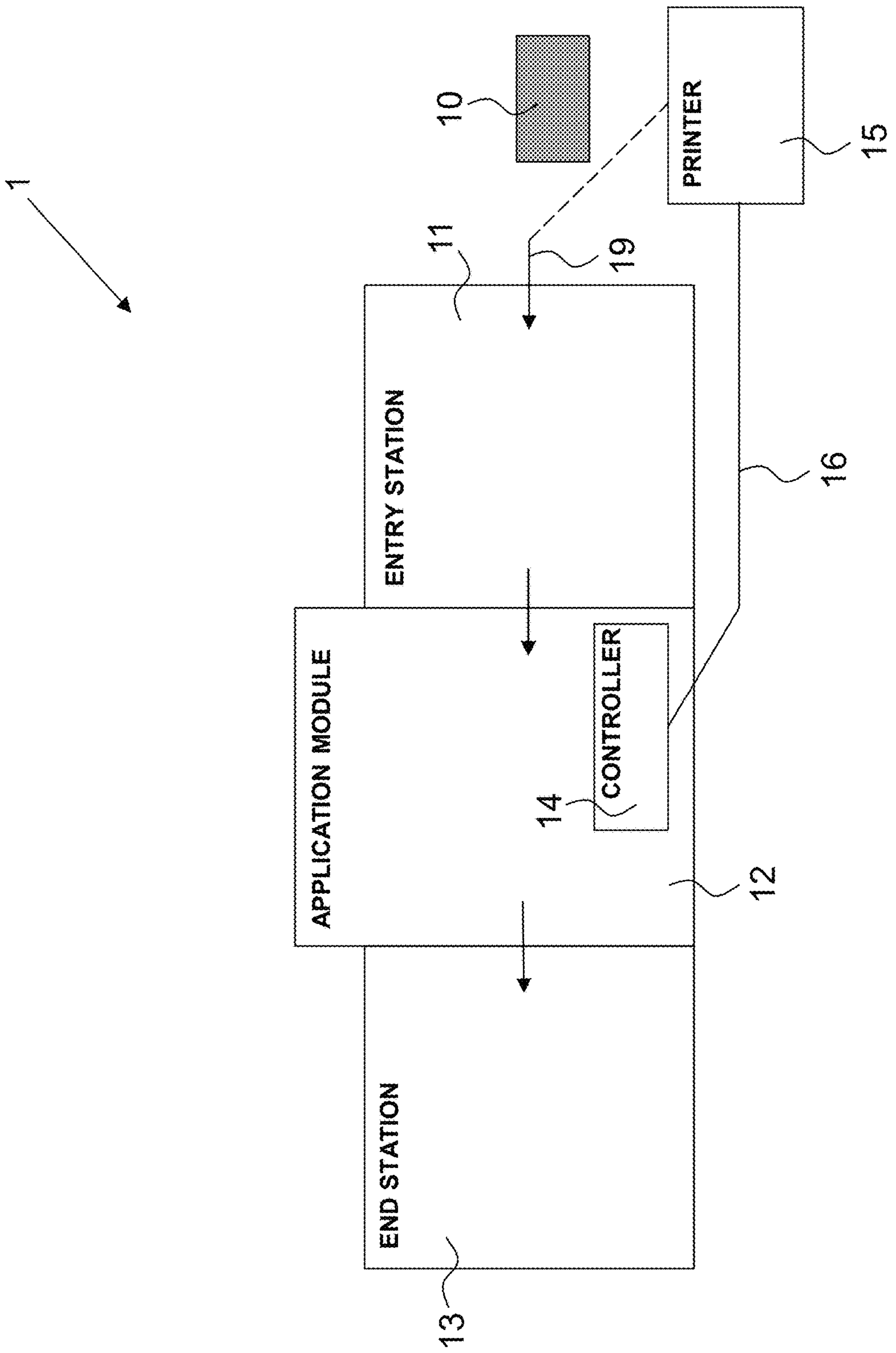
FIG. 1 is a schematic drawing of a coater configured to coat flat substrates according to the present invention.

The present invention will now be described with reference to the accompanying drawings, wherein the same reference numerals have been used to identify the same or similar elements throughout the several views.

Coating System

FIG. 1 is a schematic drawing of a coater 1 configured to coat flat substrates 10 according to the present invention. The coater 1 comprises an entry station 11 for receiving 19 the flat substrate 10 to be coated, a control system 14 for controlling print job data, print job settings and coater settings, an application module 12 for transferring a layer of coating towards the flat substrate 10, and an end station 13 for storing the flat substrate 10 when coated. The control system 14 is configured to receive print job data and print job settings from a printer, i.e. from a print controller comprised in a printing system 15 which is wired 16 or wireless connected to the coater 1.

Figure 2:
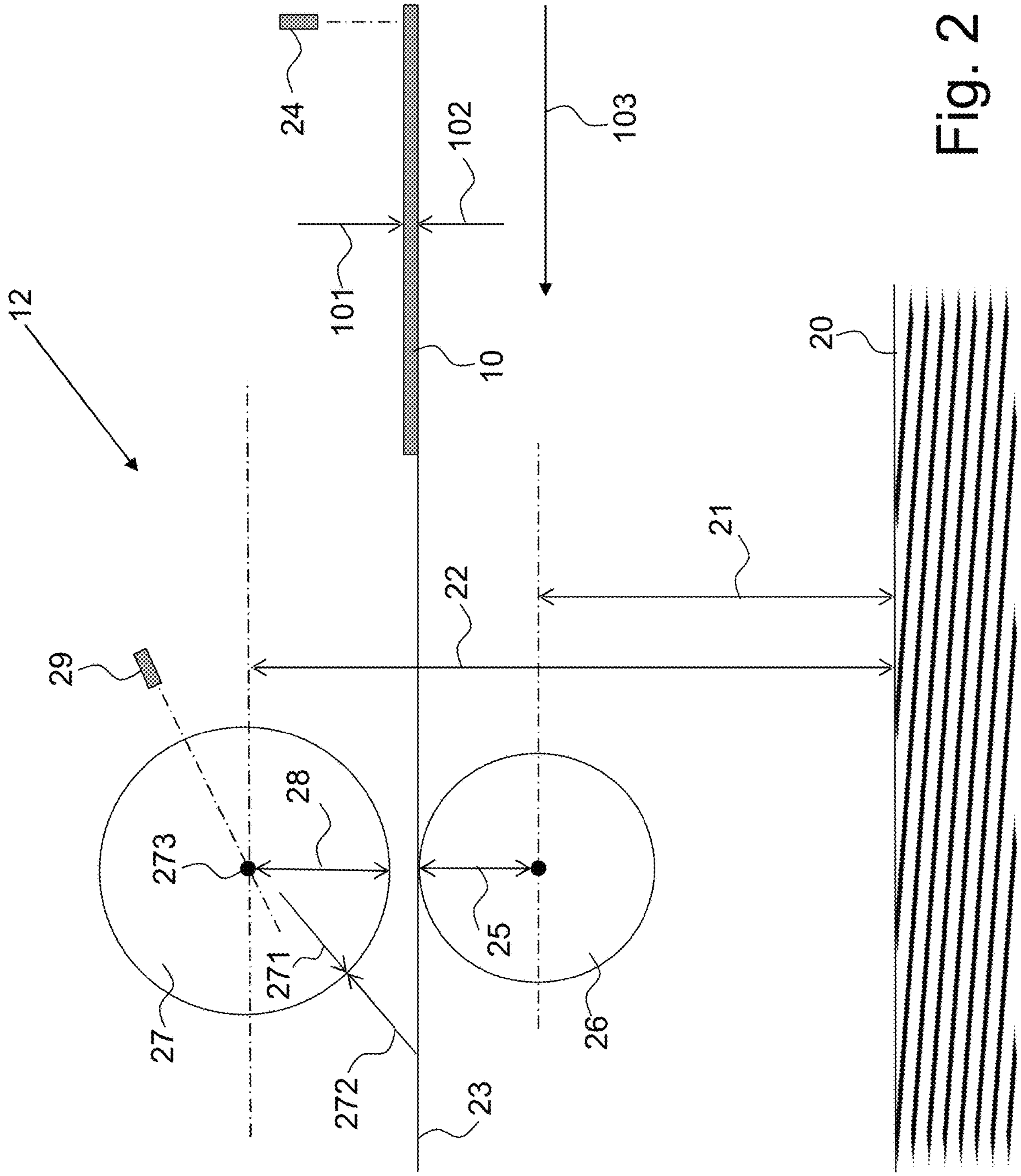
FIG. 2 is a schematic drawing of the application module comprised in the coater according to the present invention.

FIG. 2 is a schematic drawing of the application module 12 comprised in the coater 1 according to the present invention. The application module 12 comprises a supporting roller 26 having a first radius 25. The supporting roller 26 supports the flat substrate 10 when moving over the support roller 10 by means of a conveyor belt 23. The application module 12 also comprises an application roller 27 for transferring a layer of coating from a surface of the application roller 27 towards the flat substrate 10. A first sensor 29 is positioned in the application module 12 in order to determine a radius 28 of the application roller 27. The application module is configured to transport the flat substrate moving in a direction 103 from the entry station 11 (See FIG. 1) in-between the supporting roller 26 and the application roller 27 towards the end station 13 (See FIG. 1).

The applying mechanism for applying the coating on the application roller 27 is not shown in FIG. 2 and not described hereinafter, since such applying mechanisms are known and not relevant for the present invention.

The control system 14 is configured to determine a suitable impression of the application roller 27 by means of received print job settings. The first sensor 29 is configured to determine a radius 28 of the application roller 27 as a distance $R_0$ from a blanket surface of the application roller 27 to the core 273 of the application roller 27. The print job settings comprise a type of the flat substrate 10. The control system 14 is configured to read a hardness range for the type of flat substrate 10 from a set of hardness ranges for types of media stored in memory of the control system 14. The control system 14 is also configured to derive from the read hardness range a suitable impression $x_i$ of the application roller 27. In FIG. 2 the impression $x_i$ of the application roller 27 is indicated by the arrows 271, 272. For the derivation of the suitable impression $x_i$ from the read hardness range a look-up table may be implemented in memory of the controller 14. A hardness ranges may be expressed in so-called Shore A hardness range, for example 25-35, 35-60 or 60-80. The Shore A hardness scale ranges from 0 to 100. Harder materials have higher Shore A values than softer materials. In practice the value for the impression $x_i$ depends on the hardness range of the substrate and may be for example approximately one millimeter.

The controller system 14 is configured to determine an axis location of the application roller 27 having a distance D which is the quantity $R_0$ of the radius 28 of the application roller 27 plus a nominal thickness to of the flat substrate 10 read from the print job settings minus the determined suitable impression $x_1$ of the application roller 27 from the upper surface of the supporting roller 26. Expressed in a formula this is equivalent to:

$$D = R_0 + t_0 - x_i$$

The height $H_1$ of the upper surface of the supporting roller 26 may be determined by the height 21 of the supporting roller 26 having a value $h_1$ plus a quantity $R_1$ of the radius 25 of the supporting roller 26. Expressed in a formula this is equivalent to:

$$H_1 = h_1 + R_1$$

The value $H_0$ of the height 22 of the axis location 273 of the application roller 27 can be expressed as:

$$H_0 = H_1 + D = h_1 + R_1 + R_0 + t_0 - x_i$$

The heights 21 and 22 having respective values $H_1$ and $H_0$ are measured with respect to a zero plane 20 which may be for example the floor on which the coater is placed, a transportation belt on which the flat substrates arrive or a supporting structure of the transportation belt.

The control system 14 of the coater 1 is configured to send instructions to a motor system (not shown) of the coater 1 in order to automatically move the axis 273 of the application roller 27 to the determined axis location.

Once the application roller 27 is arrived at the correct location, i.e. the correct height, the transport of the flat substrate 10 from the entry station 11 in-between the supporting roller 26 and the application roller 27 towards the end station 13 can start.

According to a further embodiment the application module 12 comprises a second sensor 24 for determining an actual thickness $t_1$ of the flat substrate 10—indicated by the arrows 101, 102. When using the actual thickness $t_1$ of the flat substrate 10, the formula expressions become:

$$D = R_0 + t_1 - x_i$$

$$H_0 = H_1 + D = h_1 + R_1 + R_0 + t_1 - x_i$$

The adjustment of D or $H_0$ may take place for every substrate in order to keep the impression for each substrate on a good level. Adjustment of D or $H_0$ takes place at a predetermined time after measuring the actual thickness $t_1$ by the sensor 24 and before the arrival of the substrate 10 in-between the supporting roller 25 and the application roller 27. The predetermined time depends on the horizontal distance between the second sensor 24 and the axis of the supporting roller 26 (which equals the horizontal distance between the second sensor 24 and the axis of the application roller 27), a speed of the conveyor belt 23 and a time period needed to move the application roller 27 to the redetermined axis location 273 of the application roller 27.

The control system 14 is configured to adjust the determined axis location 273 of the application roller 27 and to instruct the motor system (not shown) to move the application roller 27 to the adjusted axis location 273. Preferably the move of the application roller 27 is planned in-between the flat substrates lying on the conveyor belt 23. Nevertheless a move of the application roller 27 may overlap with an end of the previous flat substrate in-between the supporting roller 26 and the application roller 27.

Preferably the second sensor 24 in FIG. 2 is positioned between the entry station 11 and the application module 12. Nevertheless a position of the second sensor may be envisioned between the application module 12 and the end station 13.

The flat substrate 10 may be a print medium which is printed upon by the printer 15 or by another printer as long as the printer is digitally connected to the coater 1 for transferring print job data and print job settings. The printer 15 may also physically connected to the coater 1 by placing the printer 15 in-line with the coater 1 in order to establish a smooth transport of the printed flat substrate 10 from the printer 15 to the entry station 11 of the coater 1.

Control

Figure 3:
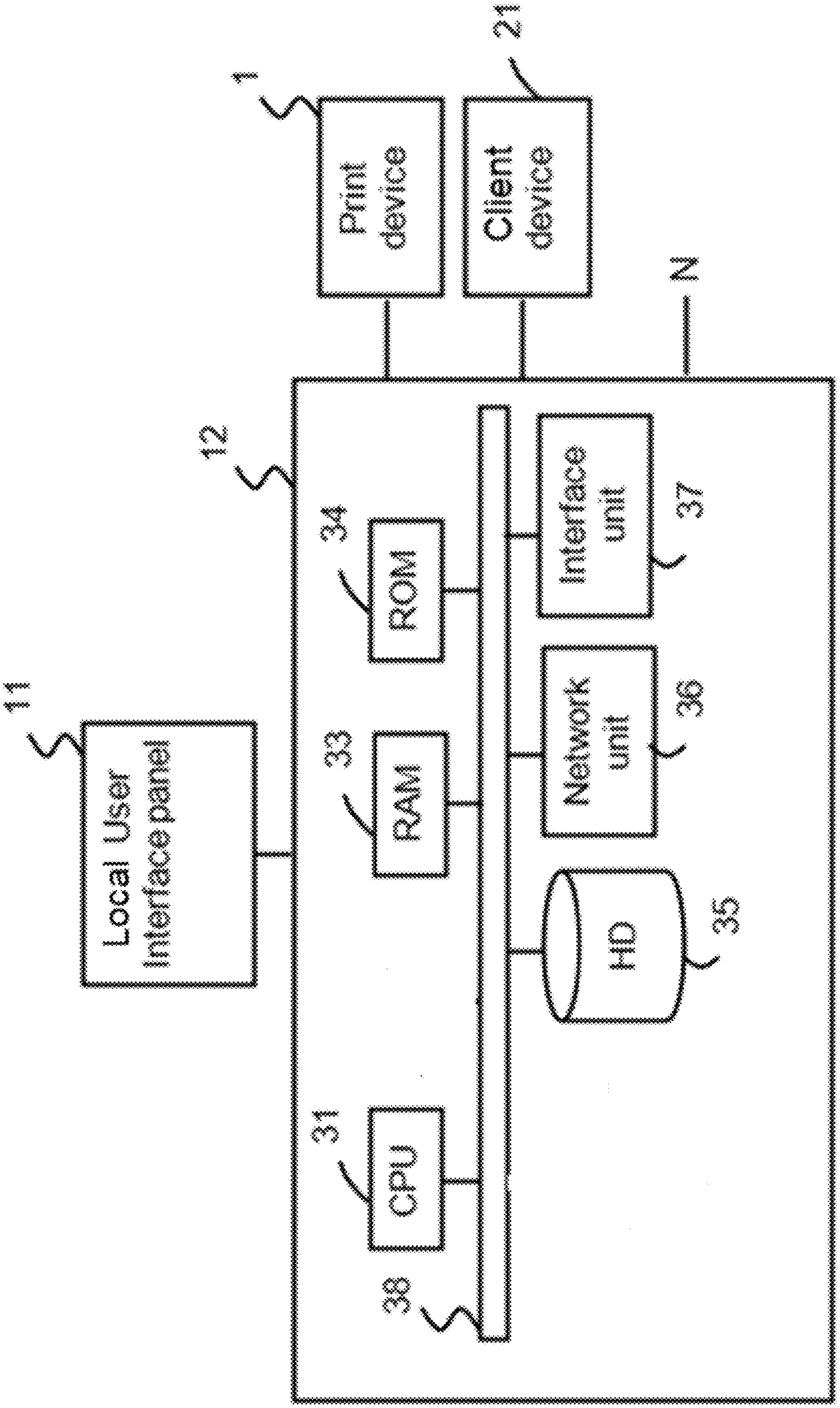
FIG. 3 is a schematic block diagram illustrating the control system of the coater according to the present invention.

An embodiment of the control unit 14 is in more detail presented in FIG. 3. As shown in FIG. 3, the control unit 14 comprises a Central Processing Unit (CPU) 31, a Random Access Memory (RAM) 33, a Read Only Memory (ROM) 34, a network unit 36, an interface unit 37 and a hard disk (HD) 35. The aforementioned units 31-37 are interconnected through a bus system 38. However, the control unit 14 may also be a distributed control unit.

The CPU 31 controls the coater 1 in accordance with control programs stored in the ROM 34 or on the HD 35 and the local user interface panel 11. Instead of local user interface panel on the coater, a user interface may be envisioned that is installed close to and digitally connected to the coater, for example a user interface which is integrated with the user interface of a printing system from which the print jobs are received. The ROM 34 stores programs and data such as boot program, set-up program, various set-up data or the like, which are to be read out and executed by the CPU 31. The hard disk is an example of a non-volatile storage unit for storing and saving programs and data which make the CPU 31 execute a coating process to be described later in the method according to the present invention. The hard disk 35 also comprises an area for saving the data of externally submitted print jobs, like print job settings. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 14 to the client device 21 and to the printing system 15. The control unit 14 may be is connected via an OPC UA interface to a print controller of the printer 15. OPC Unified Architecture (OPC UA) is a machine-to-machine communication protocol used for industrial automation and developed by the OPC Foundation. The OPC UA platform is an platform-independent service-oriented architecture that integrates individual OPC Classic specifications into an extensible framework. The network unit 36 connects the control unit 14 to the network N and is designed to provide communication with workstations and with other devices reachable via the network N. The print job settings contains a plurality of media properties of the print medium, i.e. the flat substrate, upon which the coating will be applied. Media properties are for example a type of print medium, a hardness of the print medium and a thickness of the print medium.

FIG. 3 discloses an example of a first method according to the invention. This invention contains a step-wise approach using sensor data, print job settings, hardness data and a calculation to come to a perfect impression without operator interaction and without generating waste substrates, while working on normal coating speed. When a printer is in-line with and placed before the entry station of the coater the coating speed may be tuned to the printing speed.

The first method starts in a starting point A which leads to a first step S1.

In the first step S1 the control system receives print job data and print job settings from a printing system which has received the print job. The print job data and print job settings comprise the type of print medium, a thickness of the print medium and other media properties. The print job data and the print job settings may be received via a network connected to the controller of the coater.

In a second step S2 the control system determines a suitable impression of the application roller by means of received print job settings as explained here-above.

In a third step S3 the first sensor determines a radius of the application roller.

In a fourth step S4 the control system determines an axis location of the application roller having a distance of the radius of the application roller plus a nominal thickness of the flat substrate read from the print job data minus the determined suitable impression from the supporting roller surface.

In a fifth step S5 the motor system of the coater-instructed by the control system-automatically moving the application roller to the determined axis location.

In a sixth step S6, the transport of the flat substrate from the entry station in-between the supporting roller and the application roller towards the end station is started.

The method ends in an end point B.

According to a second method of the present invention, additional steps T1-T3 are added to the steps S1-S6 of the first method. The additional steps T1-T3 are executed for every piece of substrate arriving at the entry station of the coater. The application module comprises a second sensor for determining an actual thickness of the flat substrate.

In the first additional step T1 the second sensor determines an actual thickness of the flat substrate.

In the second additional step T2 the control system adjusts the determined axis location of the application roller by using the actual thickness of the flat substrate instead of the initially used nominal thickness of the flat substrate.

In a third additional step T3 the motor system moves by means of instructions received from the control system of the coater the application roller to the adjusted axis location.

Figure 4:
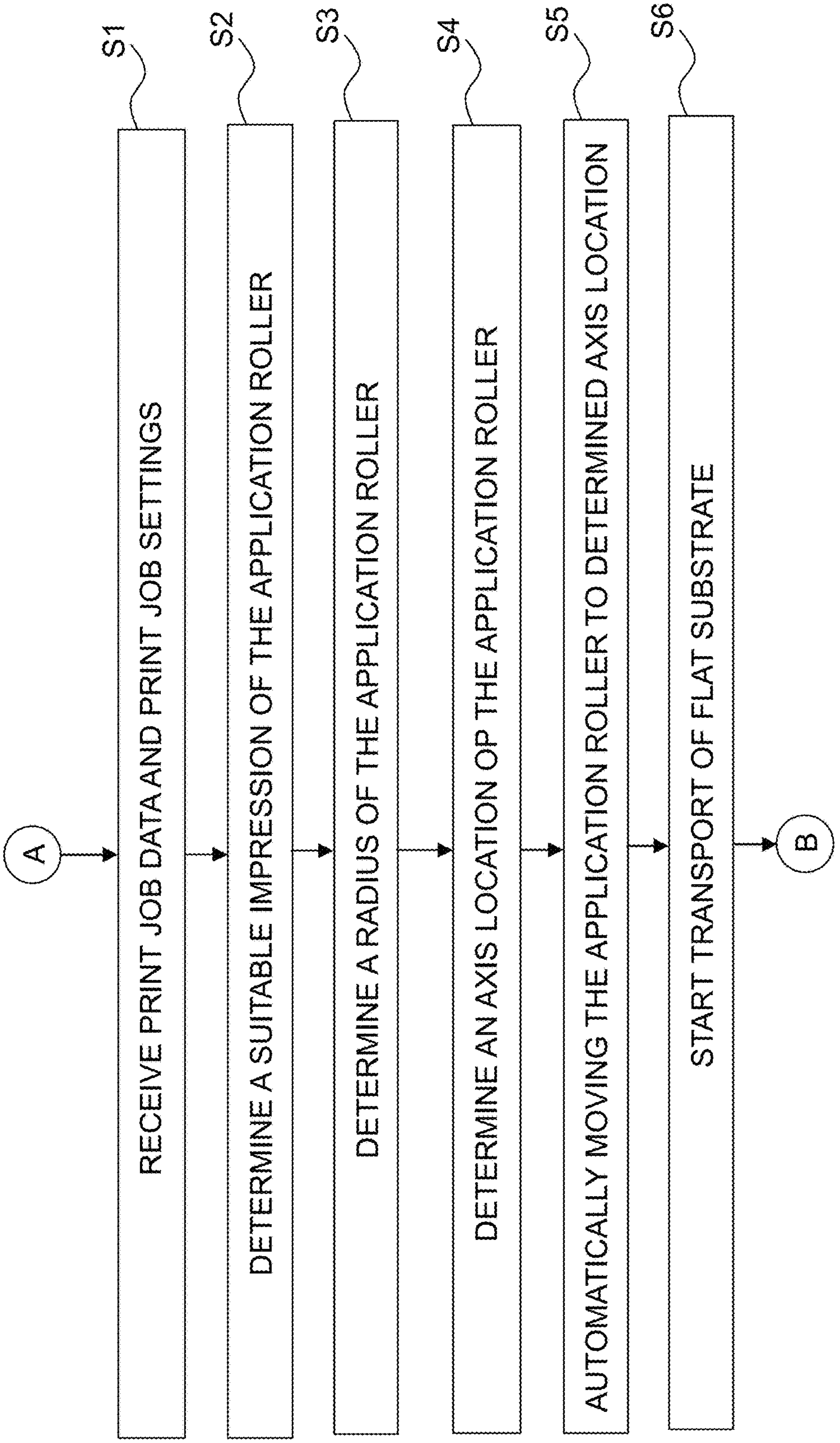
FIG. 4 is a schematic block diagram illustrating the steps of a first method according to the present invention.
Figure 5:
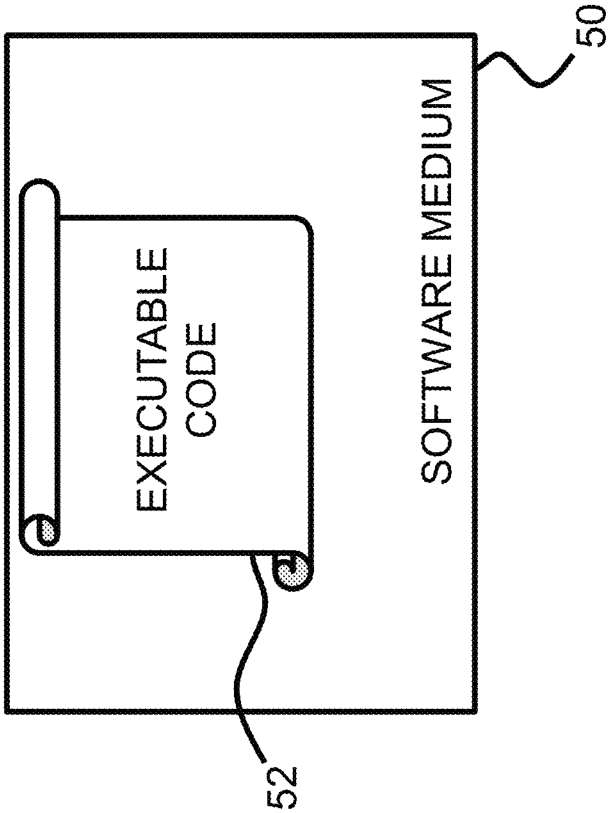
FIG. 5 is a diagram of a software product according to the present invention.

FIG. 5 schematically shows a non-transitory software medium 50 according to the invention. The software medium 50 comprises executable code 52 configured to, when executed, perform the method according to the invention, e.g. as described with respect to either the coating system 1 shown in FIG. 1 or the method of controlling the printing system 1 according to the present invention shown in FIG. 4 and/or according to any of the variants and modifications of the coating system 1 and/or of the method described herein.

The non-transitory software medium 50 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for coating a flat substrate by a coater comprising an entry station for receiving the flat substrate to be coated, a control system for controlling print job data, print job settings and coater settings, an application module comprising a supporting roller for supporting the flat substrate and an application roller for transferring a layer of coating from a surface of the application roller towards the flat substrate, an end station for storing the flat substrate when coated, and a first sensor for determining a radius of the application roller, wherein the application module is configured to transport the flat substrate from the entry station in-between the supporting roller and the application roller towards the end station, and wherein the method comprises the steps of:

the control system receiving print job data and print job settings;

the control system determining an impression value of the application roller by means of received print job settings;

the first sensor determining a radius of the application roller;

determining an axis location of the application roller having a distance of the radius of the application roller plus a nominal thickness of the flat substrate read from the print job data minus the determined impression value from the supporting roller surface;

automatically moving the application roller to the determined axis location; and starting the transport of the flat substrate from the entry station in-between the supporting roller and the application roller towards the end station.

2. The method according to claim 1, wherein the step of the control system determining an impression value of the application roller by means of the print job settings comprises the sub-steps of:

reading from the print job settings a type of the flat substrate;

reading a hardness range for the type of flat substrate from a set of hardness ranges for types of media stored in memory of the control system; and deriving from the read hardness range an impression value of the application roller.

3. The method according to claim 2, wherein the step of the control system determining an impression value of the application roller by means of received print job settings comprises a sub-step of deriving the impression value from the read hardness range by means of a look-up table implemented in memory of the control system.

4. The method according to claim 1, wherein the application module comprises a second sensor for determining an actual thickness of the flat substrate and the method comprises the steps of:

determining an actual thickness of the flat substrate;

adjusting the determined axis location of the application roller; and moving the application roller to the adjusted axis location.

5. The method according to claim 4, wherein the second sensor is positioned between the entry station and the application module or between the application module and the end station.

6. The method according to claim 1, wherein the flat substrate is a print medium which is printed upon by a printer connected to the coater.

7. A coater comprising:

an entry station for entering a flat substrate to be coated;

a control system for controlling print job data, print job settings and coater settings;

an application module comprising a supporting roller for supporting the flat substrate and an application roller for transferring a layer of coating from a surface of the application roller towards the flat substrate;

an end station for storing the flat substrate when coated; and a first sensor for determining a radius of the application roller, wherein the application module is configured to transport the flat substrate from the entry station in-between the supporting roller and the application roller towards the end station, and wherein the coater is configured to perform the steps of the method according to claim 1.

8. The coater according to claim 7, wherein the application module comprises a second sensor for determining an actual thickness of the flat substrate, and the coater is configured to perform the steps of:

determining an actual thickness of the flat substrate;

adjusting the determined axis location of the application roller; and moving the application roller to the adjusted axis location.

9. A software product comprising program code on a non-transitory machine-readable medium, which program code, when loaded into a control system of a coater, causes the coater to execute the steps of the method according to claim 1.

* * * * *